US008809523B2

(12) United States Patent
Mayo et al.

(10) Patent No.: US 8,809,523 B2
(45) Date of Patent: Aug. 19, 2014

(54) METHOD OF MAKING NANOSIZED PARTICLES OF PHTHALOCYANINE PIGMENTS

(75) Inventors: James D. Mayo, Mississauga (CA); Rina Carlini, Oakville (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 1138 days.

(21) Appl. No.: 12/177,727

(22) Filed: Jul. 22, 2008

(65) Prior Publication Data

US 2009/0227785 A1    Sep. 10, 2009

Related U.S. Application Data

(63) Continuation-in-part of application No. 12/054,915, filed on Mar. 25, 2008.

(60) Provisional application No. 61/035,334, filed on Mar. 10, 2008.

(51) Int. Cl.
    *C09B 47/04*    (2006.01)

(52) U.S. Cl.
    USPC ........................................................ 540/143

(58) Field of Classification Search
    USPC ........................................................ 540/143
    See application file for complete search history.

(56) References Cited

U.S. PATENT DOCUMENTS

| | | |
|---|---|---|
| 3,973,981 A | 8/1976 | Miyatake et al. |
| 4,088,507 A | 5/1978 | Tanaka et al. |
| 5,278,020 A | 1/1994 | Grushkin et al. |
| 5,290,654 A | 3/1994 | Sacripante et al. |
| 5,308,734 A | 5/1994 | Sacripante et al. |
| 5,318,623 A | 6/1994 | Azuma et al. |
| 5,344,738 A | 9/1994 | Kmiecik-Lawrynowicz et al. |
| 5,346,797 A | 9/1994 | Kmiecik-Lawrynowicz et al. |
| 5,364,729 A | 11/1994 | Kmiecik-Lawrynowicz et al. |
| 5,370,963 A | 12/1994 | Patel et al. |
| 5,403,693 A | 4/1995 | Patel et al. |
| 5,418,108 A | 5/1995 | Kmiecik-Lawrynowicz et al. |
| 5,679,138 A | 10/1997 | Bishop et al. |
| 6,197,103 B1 | 3/2001 | Davies et al. |
| 6,472,523 B1 | 10/2002 | Banning et al. |
| 6,476,219 B1 | 11/2002 | Duff et al. |
| 2007/0012221 A1 | 1/2007 | Maeta et al. |

FOREIGN PATENT DOCUMENTS

| | | |
|---|---|---|
| EP | 1 036 824 A2 | 9/2000 |
| JP | A-57-151654 | 9/1982 |
| JP | A-61-203175 | 9/1986 |
| JP | A-63-207858 | 8/1988 |
| JP | A-08-302229 | 11/1996 |
| JP | A-2000-327682 | 11/2000 |
| JP | A-2002-155219 | 5/2002 |
| WO | 2006/005536 | 1/2006 |
| WO | 2006/132443 | 12/2006 |
| WO | 2007/088662 | 8/2007 |

OTHER PUBLICATIONS

Fukuda et al.Deformed phthalocyanines: Synthesis and characterization of zinc phthalocyanines bearing phenyl substituents at the 1-, 4-, 8-, 11-, 15-, 18-, 22-, and/or 25-positions Chemistry-A European Journal (2005), 11(18), 5205-5216.*
A. N. Cammidge et al., "Synthesis and Characterisation of some 1,4,8,11 ,I 5,18,22,25-Octa(alkoxymethyl)-phthalocyanines; a New Series of Discotic Liquid Crystals," *J. Chem. Soc. Perkin Trans.*, vol. 1, pp. 3053 (1991).
A. Sastre et al., "Synthesis of Novel Unsymmetrical Substituted Push-Pull Phthalocyanines," *J. Org. Chem.*, vol. 61, No. 24, pp. 8591-97 (1996).
C. Piechoki et al., "Synthesis of Polar Discogen. A New Type of Discotic Mesophase," *Chem. Comm.*, pp. 259-60 (1985).
E. Orthmann et al., "Preparation of Ultrathin Layers of Molecularly Controlled Architecture from Polymeric Phthalocyanines by the Langmuir-Blodgett-Technique," *Angew. Chem. Int. Ed. Engl.*, vol. 25, pp. 1105-07 (1986).
G. Pawlowski et al., "A Convenient Synthesis of Octasubstituted Phthalocyanines," *Synthesis*, pp. 287-89 (1980).
J. G. Young et al., "Synthesis and Characterization of Di-disubstituted Phthalocyanines," *J. Org. Chem.*, vol. 55, No. 7, pp. 2155-59 (1990).
K. Balakrishnan et al., "Effect of Side-Chain Substituents on Self-Assembly of Perylene Diimide Molecules: Morphology Control," *J. Am. Chem. Soc.*, vol. 128, p. 7390-98 (2006).
K. Ohta et al., "Influence of the Nature of the Side Chains on the Mesomorphic Properties of Octasubstituted Phthalocyanine Derivatives. Annelides XXIX," *New J. Chem.*, col. 12, pp. 751-54 (1988).
M. J. Cook et al., "Octa-alkoxy Phthalocyanine and Naphthalocyan ine Derivatives: Dyes with Q-Band Absorption in the Far Red or Near Infrared," *J. Chem. Soc. Perkin Trans.*, vol. 1, pp. 2453-58 (1988).
N. B. McKeown et al., "Synthesis and Characterisation of some 1,4,8,11 ,I 5,1 8,22,25-0cta-alkyl- and 1,4,8,11,I 5,18-Hexa-alkyl-22,25-bis(carboxypropyl)phthalocyanines," *J. Chem. Soc. Perkin Trans.*, vol. 1, pp. 1169-77 (1990).
N. B. McKeown et al., *Phthalocyanine Materials*, Cambridge University Press, Chapter 1, Table 1.1, pp. 4-6 (1998).
N. Kobayashi et al., " Symmetrically Tetra-substituted Phthalocyanines," *Chem. Soc. Chem. Comm.*, pp. 390-92 (1987).
U.S. Appl. No. 11/759,906 to Maria Birau et al. filed Jun. 7, 2007.
U.S. Appl. No. 11/759,913 to Rina Carlini et al. filed Jun. 7, 2007.

(Continued)

*Primary Examiner* — Brian McDowell
(74) *Attorney, Agent, or Firm* — Pillsbury Winthrop Shaw Pittman LLP

(57) ABSTRACT

Nanoscale pigment particles of phthalocyanine pigments are prepared by providing a unsubstituted phthalocyanine chromogen material and a substituted phthalocyanine chromogen material, reacting the unsubstituted phthalocyanine chromogen material and the substituted phthalocyanine chromogen material to form a mixture of unsubstituted phthalocyanine dye molecules and substituted phthalocyanine dye molecules, and causing the substituted phthalocyanine dye molecules to non-covalently associate with the unsubstituted phthalocyanine dye molecules, so as to limit an extent of particle growth and aggregation and result in nanoscale pigment particles.

12 Claims, No Drawings

(56) References Cited

OTHER PUBLICATIONS

U.S. Appl. No. 11/933,461 to Maria Birau et al. filed Nov. 1, 2007.
U.S. Appl. No. 11/933,469 to C. Geoffrey Allen et al. filed Nov. 1, 2007.
U.S. Appl. No. 11/933,470 to C. Geoffrey Allen et al. filed Nov. 1, 2007.
U.S. Appl. No. 11/933,471 to Rina Carlini et al. filed Nov. 1, 2007.
U.S. Appl. No. 12/044,613 to Rina Carlini filed Mar. 7, 2008.
U.S. Appl. No. 12/054,915 to James D. Mayo et al. filed Mar. 25, 2008.
Bunshin Shuppan, Phthalocyanine "Basic Physical Properties and Applications to Functional Materials", pp. 26, May 31, 1991.
"Chromogen, RÖMPP Online", Version 3.19, Jun. 15, 2000. Retrieved from the internet URL:http://www.roempp.com/prod/.
Feb. 14, 2012 European Search Report issued in European Application No. 09152967.7.

* cited by examiner

METHOD OF MAKING NANOSIZED PARTICLES OF PHTHALOCYANINE PIGMENTS

This application is a continuation-in-part of U.S. patent application Ser. No. 12/054,915 to James D. Mayo et al. filed Mar. 25, 2008, and which claims the benefit of U.S. Provisional Application No. 61/035,334, filed Mar. 10, 2008, the entire disclosures of which are incorporated herein by reference.

TECHNICAL FIELD

This disclosure is generally directed to methods for making nanoscale pigment particle compositions, and uses of such compositions, for example, in ink compositions. More specifically, this disclosure is directed to nanometer-sized particles of phthalocyanine pigments synthesized by forming the particles of phthalocyanine pigment from a mixture of phthalocyanine chromogen material and hydrophobically substituted phthalocyanine chromogen material. Such nanometer-sized pigment particles are useful, for example, as colorizing agents for ink jet inks, printing inks, toner compositions, paints and coatings, resins, and the like.

CROSS-REFERENCE TO RELATED APPLICATIONS

Disclosed in commonly assigned U.S. patent application Ser. No. 12/044,613 to Rina Carlini filed Mar. 7, 2008, is a nanoscale pigment particle composition, comprising: a benzimidazolone pigment, and a sterically bulky stabilizer compound associated non-covalently with the benzimidazolone pigment; wherein the presence of the associated stabilizer limits an extent of particle growth and aggregation, to afford nanoscale-sized pigment particles. Also disclosed is a process for preparing nanoscale particles of benzimidazolone pigments, comprising: providing one or more organic pigment precursor to a benzimidazolone pigment, providing a solution or suspension of a sterically bulky stabilizer compound that associates non-covalently with the benzimidazolone moiety on one of the pigment precursors, and carrying out a chemical coupling reaction to form a benzimidazolone pigment composition, whereby the pigment precursors are incorporated with the benzimidazolone pigment and one or more functional moieties on the benzimidazolone pigment is non-covalently associated with the steric stabilizer, so as to limit the extent of particle growth and aggregation and result in nanoscale-sized pigment particles.

Disclosed in commonly assigned U.S. patent application Ser. No. 11/759,913 to Rina Carlini et al. filed Jun. 7, 2007, is a nanoscale pigment particle composition, comprising: an organic monoazo laked pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized pigment particles. Also disclosed is a process for preparing nanoscale-sized monoazo laked pigment particles, comprising: preparing a first reaction mixture comprising: (a) a diazonium salt including at least one functional moiety as a first precursor to the laked pigment and (b) a liquid medium containing diazotizing agents generated in situ from nitrous acid derivatives; and preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium combining the first reaction mixture into the second reaction mixture to form a third solution and effecting a direct coupling reaction which forms a monoazo laked pigment composition wherein the functional moiety associates non-covalently with the functional group and having nanoscale particle size. Further disclosed is a process for preparing nanoscale monoazo laked pigment particles, comprising: providing a monoazo precursor dye to the monoazo laked pigment that includes at least one functional moiety; subjecting the monoazo precursor dye to an ion exchange reaction with a cation salt in the presence of a sterically bulky stabilizer compound having one or more functional groups; and precipitating the monoazo laked pigment as nanoscale particles, wherein the functional moiety of the pigment associates non-covalently with the functional group of the stabilizer and having nanoscale particle size.

Disclosed in commonly assigned U.S. patent application Ser. No. 11/933,471 to Rina Carlini et al. filed Nov. 1, 2007, is a process for preparing nanoscale particles of monoazo laked pigments, comprising: providing an organic pigment precursor to a monoazo laked pigment that contains at least one functional moiety, providing a sterically bulky stabilizer compound that contains at least one functional group, and carrying out a chemical reaction to form a monoazo laked pigment composition, whereby the functional moiety found on the pigment precursor is incorporated within the monoazo laked pigment and non-covalently associated with the functional group of the stabilizer, so as to allow the formation of nanoscale-sized pigment particles. In one embodiment, the process comprises preparing a first reaction mixture comprising: (a) a diazonium salt including at least one functional moiety as a first precursor to the laked pigment and (b) a liquid medium containing diazotizing agents; preparing a second reaction mixture comprising: (a) a coupling agent including at least one functional moiety as a second precursor to the laked pigment and (b) a sterically bulky stabilizer compound having one or more functional groups that associate non-covalently with the coupling agent; and (c) a liquid medium; combining the first reaction mixture into the second reaction mixture to form a third solution; and effecting a direct coupling reaction which forms a monoazo laked pigment composition having nanoscale particle size, and wherein a functional moiety of the pigment associates non-covalently with the functional group of the stabilizer. In another embodiment the process comprises providing a monoazo precursor dye to the monoazo laked pigment that includes at least one functional moiety; subjecting the monoazo precursor dye to an ion exchange reaction with a cation in the presence of a sterically bulky stabilizer compound having one or more functional groups; and precipitating the monoazo laked pigment having nanoscale particle size, wherein the functional moiety of the pigment associates non-covalently with the functional group of the stabilizers.

Disclosed in commonly assigned U.S. patent application Ser. No. 11/933,469 to C. Geoffrey Allen et al. filed Nov. 1, 2007, is a nanoscale pigment particle composition, comprising: an organic monoazo laked pigment including at least one functional moiety, and a sterically bulky stabilizer compound including at least one functional group, wherein the functional moiety on the pigment associates non-covalently with the functional group of the stabilizer; and the nanoscale pigment particles have an average particle size of from about 10 nm to about 500 nm and have tunable coloristic properties that depend on both particle composition and average particle size.

Disclosed in commonly assigned U.S. patent application Ser. No. 11/933,461 to Maria Birau et al. filed Nov. 1, 2007, is a process for preparing nanoscale quinacridone pigment particles, comprising: providing a first solution comprising a quinacridone pigment precursor or crude quinacridone pigment having at least one functional moiety; providing a second solution comprising a sterically bulky stabilizer compound having at least one functional group that associate non-covalently with the functional moiety on the pigment or pigment precursor; combining the first solution and the second solution to form a third mixture which forms a quinacridone pigment composition having nanoscale particle size and wherein the functional moiety on the pigment associates non-covalently with the functional group of the stabilizer.

Disclosed in commonly assigned U.S. patent application Ser. No. 11/933,470 to C. Geoffrey Allen et al. filed Nov. 1, 2007, is an ink composition comprising: a carrier, and a nanoscale pigment particles, further comprising: a quinacridone pigment composition having at least one functional moiety, and at least one sterically bulky stabilizer compound each having at least one functional group, wherein the functional moiety on the pigment associates non-covalently with the functional group of the stabilizer so as to afford nanoscale-sized particles.

Disclosed in commonly assigned U.S. patent application Ser. No. 12/044,613 to Rina Carlini filed Mar. 7, 2008, is a nanoscale pigment particle composition, comprising: a benzimidazolone pigment, and a sterically bulky stabilizer compound associated non-covalently with the benzimidazolone pigment; wherein the presence of the associated stabilizer limits an extent of particle growth and aggregation, to afford nanoscale-sized pigment particles. Also disclosed is a process for preparing nanoscale particles of benzimidazolone pigments, comprising: providing one or more organic pigment precursor to a benzimidazolone pigment, providing a solution or suspension of a sterically bulky stabilizer compound that associates non-covalently with the benzimidazolone moiety on one of the pigment precursors, and carrying out a chemical coupling reaction to form a benzimidazolone pigment composition, whereby the pigment precursors are incorporated with the benzimidazolone pigment and one or more functional moieties on the benzimidazolone pigment is non-covalently associated with the steric stabilizer, so as to limit the extent of particle growth and aggregation and result in nanoscale-sized pigment particles.

Disclosed in commonly assigned U.S. patent application Ser. No. 11/759,906 to Maria Birau et al. filed Jun. 7, 2007, is a nanoscale pigment particle composition, comprising: a quinacridone pigment including at least one functional moiety, and a sterically bulky stabilizer compound including at least one functional group, wherein the functional moiety associates non-covalently with the functional group; and the presence of the associated stabilizer limits the extent of particle growth and aggregation, to afford nanoscale-sized particles. Also disclosed is a process for preparing nanoscale quinacridone pigment particles, comprising: preparing a first solution comprising: (a) a crude quinacridone pigment including at least one functional moiety and (b) a liquid medium; preparing a second solution comprising: (a) a sterically bulky stabilizer compound having one or more functional groups that associate non-covalently with the functional moiety, and (b) a liquid medium; combining the first solution into the second solution to form a third solution and effecting a reconstitution process which forms a quinacridone pigment composition wherein the functional moiety of the pigment associates non-covalently with the functional group of the stabilizer and having nanoscale particle size. Still further is disclosed a process for preparing nanoscale quinacridone pigment particles, comprising: preparing a first solution comprising a quinacridone pigment including at least one functional moiety in an acid; preparing a second solution comprising an organic medium and a sterically bulky stabilizer compound having one or more functional groups that associate non-covalently with the functional moiety of the pigment; treating the second solution containing with the first solution; and precipitating quinacridone pigment particles from the first solution, wherein the functional moiety associates non-covalently with the functional group and the quinacridone pigment particles have a nanoscale particle size.

The entire disclosures of the above-mentioned applications are totally incorporated herein by reference.

REFERENCES

The concept of using crystal growth inhibitors such as pyromellitic diimide, trimellitic acid, and aromatic sulphonic acid has been reported in the literature. See, for example, Japanese Patent Publications Nos. JP 63-207858 to F. Taira and K. Noriaka entitled "Production of copper Phthalocyanine Pigment" (1998), JP 61-203175 to T. Masao and S. Takashi entitled "Production of Copper Phthalocyanine" (1986), and JP 57-151654 to Y. Nobuo, A. Kazuyuki, and S. Ichiro entitled "Preparation of Copper Phthalocyanine Pigment having low Chlorination degree." These crystal growth inhibitors are used during synthesis of the copper phthalocyanine pigment in order to produce micronized pigment particles of conventional size (about 100-500 nm) without additional processing steps after synthesis, such as either dry milling or acid-pasting reprecipitation processes.

Use of derivatized phthalocyanine compounds as crystal growth inhibitor agents or additives is reported in, for example, EP 1 036 824. However, in that disclosure, the composition of the derivatized phthalocyanine additives are typically mono-carboxamide derivatives and do not contain aliphatic, sterically bulky alkyl chains for the purpose of imposing a steric barrier to modulate crystal packing. Furthermore, the patent discloses data for specific surface area of the pigments that is typically found for larger-sized pigment particles having average particle sizes in the range of 200-500 nm.

U.S. Pat. No. 5,318,623 discloses a process for producing a metal phthalocyanine pigment particles of a fine particle size, whereby the pigment is synthesized using conventional methods, and allowing the reaction mixture to react while simultaneously applying a mechanical grinding force in the presence or absence of a grinding agent.

WO 2007/088662 describes a process for producing fine phthalocyanine pigment particles, which comprises dissolving a phthalocyanine pigment in a good solvent containing a pigment dispersant comprising a compound represented by the formula:

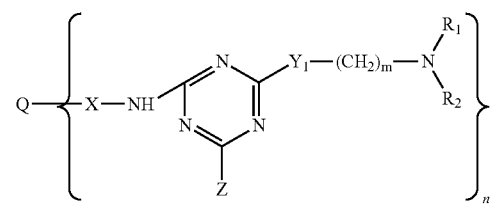

to prepare a pigment solution and mixing the solution with a solvent that is compatible with that good solvent and is a poor solvent for the phthalocyanine pigment to precipitate the phthalocyanine pigment as nanometer-size particles. In the formula, Q represents a residue of an organic dye selected among anthraquinone dyes, etc.; X represents —CO—, etc.; Y1 represents —NH— or —O—; Z represents hydroxy, etc.; $R_1$ and $R_2$ each independently represents alkyl, etc.; m is an integer of 1-6; and n is an integer of 1-4.

U.S. Pat. No. 6,472,523 discloses compounds of the formula:

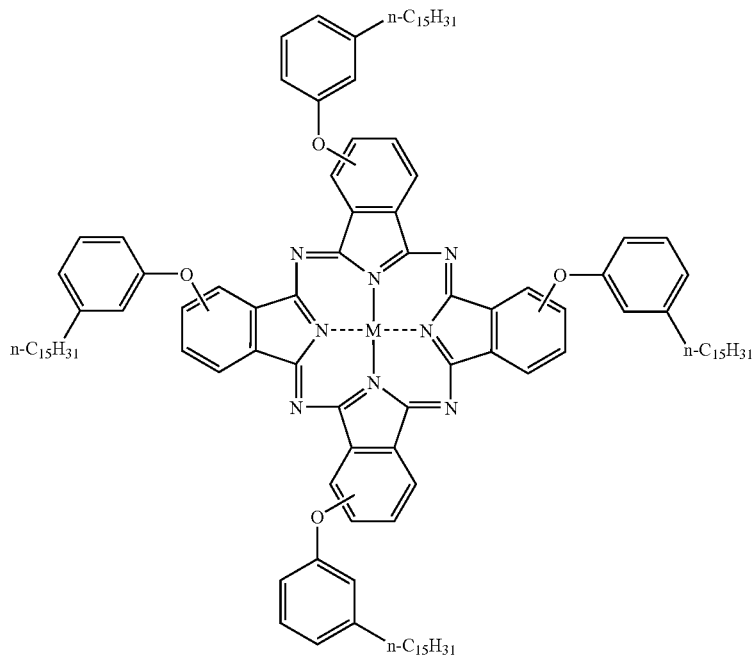

wherein M is an atom or group of atoms capable of bonding to the central cavity of a phthalocyanine molecule, wherein axial ligands optionally can be attached to M.

U.S. Pat. No. 6,476,219 describes that such compounds can be prepared by (a) reacting 3-n-pentadecylphenol with 4-nitrophthalonitrile in the presence of a base to form an alkylarylether adduct of phthalonitrile; and (b) reacting the alkylarylether adduct of phthalonitrile with either (i) a metal compound, or (ii) an ammonia-releasing compound in the presence of an alkanolamine solvent, or (iii) mixtures of (i) and (ii), to form the colorant.

K. Balakrishnan et al., "Effect of Side-Chain Substituents on Self-Assembly of Perylene Diimide Molecules: Morphology Control," *J. Am. Chem. Soc.*, vol. 128, p. 7390-98 (2006) describes the use of covalently-linked aliphatic side-chain substituents that were functionalized onto perylene diimide molecules so as to modulate the self-assembly of molecules and generate distinct nanoparticle morphologies (nano-belts to nano-spheres), which in turn impacted the electronic properties of the material. The side-chain substituents studied were linear dodecyl chain, and a long branched nonyldecyl chain, the latter substituent leading to the more compact, spherical nanoparticle.

WO 2006/005536 discloses a method for producing nanoparticles, in particular, pigment particles. Said method consists of the following steps: (i) a raw substance is passed into the gas phase, (ii) particles are produced by cooling or reacting the gaseous raw substance and (iii) an electrical charge is applied to the particles during the production of the particles in step (ii), in a device for producing nanoparticles. The disclosure further relates to a device for producing nanoparticles, comprising a supply line, which is used to transport the gas flow into the device, a particle producing and charging area in order to produce and charge nanoparticles at essentially the same time, and an evacuation line which is used to transport the charged nanoparticles from the particle producing and charging area.

WO 2006/132443 A1 describes a method of producing organic pigment fine particles by allowing two or more solutions, at least one of which is an organic pigment solution in which an organic pigment is dissolved, to flow through a microchannel, the organic pigment solution flows through the microchannel in a non-laminar state. Accordingly, the contact area of solutions per unit time can be increased and the length of diffusion mixing can be shortened, and thus instantaneous mixing of solutions becomes possible. As a result, nanometer-scale monodisperse organic pigment fine particles can be produced in a stable manner.

U.S. Pat. No. 5,679,138 discloses a process for making ink jet inks, comprising the steps of: (A) providing an organic pigment dispersion containing a pigment, a carrier for the pigment and a dispersant; (B) mixing the pigment dispersion with rigid milling media having an average particle size less than 100 µm; (C) introducing the mixture of step (B) into a high speed mill; (D) milling the mixture from step (C) until a pigment particle size distribution is obtained wherein 90% by weight of the pigment particles have a size less than 100 nanometers (nm); (E) separating the milling media from the mixture milled in step (D); and (F) diluting the mixture from step (E) to obtain an ink jet ink having a pigment concentration suitable for ink jet printers.

U.S. Patent Application Publication No. 2007/0012221 describes a method of producing an organic pigment dispersion liquid, which has the steps of: providing an alkaline or acidic solution with an organic pigment dissolved therein and an aqueous medium, wherein a polymerizable compound is contained in at least one of the organic pigment solution and the aqueous medium; mixing the organic pigment solution and the aqueous medium; and thereby forming the pigment as fine particles; then polymerizing the polymerizable compound to form a polymer immobile from the pigment fine particles.

N. B. McKeown, *Phthalocyanine Materials*, Cambridge University Press, Chapter 1, Table 1.1 (1998) discloses about seventy atoms or groups that are known to bond in the central cavity of a phthalocyanine molecule.

J. G. Young et al., "Synthesis and Characterization of Di-disubstituted Phthalocyanines," *J. Org. Chem.*, Vol. 55, No. 7, p. 2155 (1990), discloses an improved approach to the synthesis of di-disubstituted phthalocyanines from two different phthalyl precursors wherein the resultant product contains two different R-groups. This method can be applied to the synthesis of both metal-free and metal-coordinated phthalocyanines.

A class of phthalocyanines that are soluble in common organic solvents is the peripherally octa-substituted compounds illustrated below. The substituents can occupy either the 1,4- or the 2,3-positions. When both groups $R_x$ and $R_y$ are the same, these compounds are generally obtained as a single isomer. The solubility in a given solvent is related to the nature and chain length of the R group ($R_x$ and/or $R_y$), with more than about five carbon atoms per chain being typical:

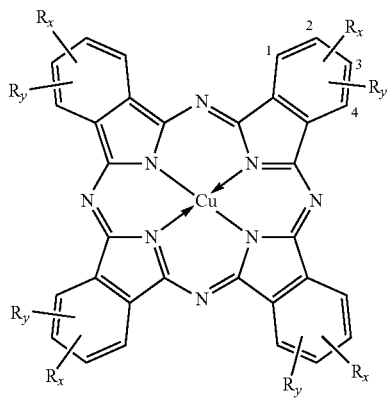

Many examples have been reported for this class, for example: 2,3-alkyl (K. Ohta, L. Jacquemin, C. Sirlin, L. Bosio, and J. Simon, *New J. Chem.*, 12 (1988), 751), 1,4-alkyl (N. B. McKeown, I. Chambrier, and M. J. Cook, *J. Chem. Soc. Perkin Trans.*, 1 (1990), 1169), 2,3-alkoxy (E. Orthmann and G. Wegner, *Angew. Chem. Int. Ed. Engl.*, 25 (1986), 1105), 1,4-alkoxy (A. N. Cammidge, M. J. Cook, K. J. Harrison, and N. B. McKeown, *J. Chem. Soc. Perkin Trans.*, 1 (1991), 3053), 2,3-alkoxymethylene (G. Pawlowski and M. Hanack, *Synthesis*, (1980), 287; and C. Piechoki and J. Simon, *Chem. Comm.* (1985), 259), 1,4-alkoxymethylene (M. J. Cook, A. J. Dunn, S. D. Howe, A. J. Thomson, and K. J. Harrison, *J. Chem. Soc. Perkin Trans.*, 1 (1988), 2453), and 2,3-alkyldicarboximide (N. Kobayashi, Y. Nishiyama, T. Oya, and M. Sato, *J. Chem. Soc. Chem. Comm.*, (1987), 390).

The disclosures of each of the foregoing patents and publications are hereby incorporated by reference herein in their entireties. The appropriate components and process aspects of the each of the foregoing patents and publications may also be selected for the present compositions and processes in embodiments thereof.

BACKGROUND

A printing ink is generally formulated according to strict performance requirements that are demanded by the printing technology intended for the ink, as well as customer needs. Whether formulated for office printing or for large volume production printing, a particular ink is expected to produce images that are robust and durable under stress conditions. Ink jetting devices are known in the art, and thus extensive description of such devices is not required herein. In a typical design of a piezoelectric ink jet printing device, the image is applied by jetting appropriately colored inks during four to six rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot-melt solid inks that are typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents show through on the paper. In these systems, the crystalline wax inks are jetted onto a transfer member, for example, an aluminum drum, at temperatures of approximately 130-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

Pigments are a type of insoluble colorant that are useful in a variety of applications such as, for example, paints, plastics and inks, including inkjet printing inks. Dyes on the other hand, are readily soluble colorants and have typically been the colorants of choice for applications such as inkjet printing inks. Dyes have also offered superior and brilliant color quality with an expansive color gamut for inks, when compared to conventional pigments. However, since dyes are molecularly dissolved in the ink vehicle, they are often susceptible to unwanted interactions that lead to poor ink performance, for example photo-oxidation from light (leads to poor lightfastness), dye diffusion from the ink into paper or other substrates (leads to poor image quality and showthrough), and the ability for the dye to leach into another solvent that makes contact with the image (leads to poor water-/solvent-fastness). In certain situations, pigments have the potential to be a better alternative as colorants for inkjet printing inks since they are insoluble and cannot be molecularly dissolved within the ink matrix, and in most cases do not experience colorant diffusion or color degradation. Pigments can also be significantly less expensive than dyes, and so are attractive colorants for use in all printing inks.

Key challenges with using pigments for inkjet inks are their large particle sizes and wide particle size distribution, the combination of which can pose critical problems with reliable jetting of the ink (i.e. inkjet nozzles are easily blocked). Pigments are rarely obtained in the form of single crystal nanoparticles, but rather as micron-sized large aggregates of crystals and often having a wide distribution of aggregate sizes. The color characteristics of the pigment aggregate can vary widely depending on the aggregate size and crystal morphology. Thus, an ideal colorant that is widely applicable in, for example, inks and toners, is one that possesses the best properties of both dyes and pigments, namely: 1) superior coloristic properties (large color gamut, brilliance, hues, vivid color); 2) color stability and durability (thermal, light, chemical and air-stable colorants); 3) minimal or no colorant migration; 4) processable colorants (easy to disperse and stabilize in a matrix); and 5) inexpensive material cost.

Thus, there is a need addressed by embodiments of the present disclosure, for smaller nano-sized pigment particles that minimize or avoid the problems associated with conventional larger-sized pigment particles. There further remains a need for processes for making and using such improved nano-sized pigment particles as colorant materials. The present nanosized pigment particles are useful as robust colorizing agents in, for example, paints, coatings and inks (e.g., inkjet printing inks) as well as other compositions where pigments can be used such as plastics, optoelectronic imaging components, photographic components, and cosmetics among others.

SUMMARY

The present disclosure addresses these and other needs, by providing nanoscale or nanometer-sized or "nano-sized" or "nanoscale" pigment particles, that are formed from a mixture of phthalocyanine chromogen material and hydrophobically substituted phthalocyanine chromogen material, where the hydrophobically substituted phthalocyanine chromogen material essentially acts as a pigment crystal growth regulator to control the ultimate particle size and crystal morphology of the resulting nanoscale pigment particles. The present disclosure also provides methods for using such particles, for example in electrophotographic toner and printing inks such as inkjet compositions.

More particularly, in embodiments, there is provided a synthesis method starting at the molecular level—commonly referred to as a "bottom up" process—for preparing nano-structured materials. This synthesis method desirably generates nanopigments by a self-assembling synthesis route that enables one to design features that can control particle size and shape and form size and shape-controlled particles. Moreover, a "bottom-up" synthesis method enables the ability to customize the design of the nanomaterial with versatile chemistry.

In an embodiment, the present disclosure provides a process for preparing nanoscale pigment particles of phthalocyanine pigments, comprising:

providing a unsubstituted phthalocyanine chromogen material and a substituted phthalocyanine chromogen material, reacting the unsubstituted phthalocyanine chromogen material and the substituted phthalocyanine chromogen material to form a mixture of unsubstituted phthalocyanine dye molecules and substituted phthalocyanine dye molecules, and causing said substituted phthalocyanine dye molecules to non-covalently associate with the unsubstituted phthalocyanine dye molecules, so as to limit an extent of particle growth and aggregation and result in nanoscale pigment particles.

Embodiments

Embodiments of the present disclosure provide methods for making nanoscale phthalocyanine pigment particles and printing compositions including such nanoscale phthalocyanine pigment particle compositions. The terms "nano-sized," "nanoscale," or "nanometer-sized pigment particles" refers to for instance, an average particle size, $d_{50}$, or an average particle diameter of less than about 150 nm, such as of about 1 nm to about 100 nm, or about 10 nm to about 80 nm. These nanometer-sized particles are thus distinguished, for example, from conventional pigment particles that can range in size from about 200 nm to beyond 1000 nm (1 micron) or more.

The nanoscale pigments in embodiments are formed from a mixture of phthalocyanine chromogen material and hydrophobically or hydrophilically substituted phthalocyanine chromogen material, which assemble into the final phthalocyanine pigment structure, and substituted soluble metal-phthalocyanine dye structure that together make up the nanoscale pigment particles. For example, the phthalocyanine chromogen material and hydrophobically or hydrophilically substituted phthalocyanine chromogen material can be, respectively, phthalonitrile units and hydrophobically substituted phthalonitrile precursor units. When reacted together, the resultant product is a mixture of (unsubstituted) metal phthalocyanine molecules along with mono-, di-, tri-, and tetra-substituted metal phthalocyanine dye molecules, which associate non-covalently with the (unsubstituted) metal phthalocyanine molecules to limit an extent of pigment particle growth and aggregation, to afford the desired nanoscale pigment particles. In embodiments, the nanoscale pigment particles have a phthalocyanine pigment structure, such as copper phthalocyanine, as the predominant component and a substituted soluble metal-phthalocyanine dye as the minor component. General structures of exemplary such materials are:

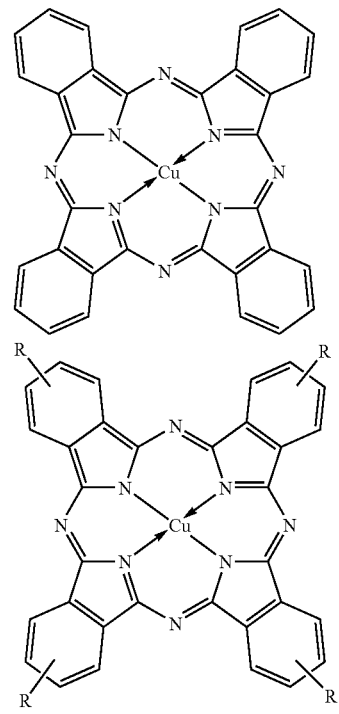

where R represents H or the hydrophobic or hydrophilic substituent, provided that at least one R is not H. Statistically, the final nanoscale pigment particles have a mixture of substituted metal-phthalocyanine dyes where one, two, three, or all four R groups are the hydrophobic or hydrophilic substituent.

The substituted soluble metal-phthalocyanine dye is designed to have one or more substituents that are either hydrophobic or hydrophilic in polarity, but are necessarily large and/or long in chain length such that when the compound is dissolved in solution, the substituents offer a sterically bulky layer around the phthalocyanine chromogen, or colored core structure. Although not limited by any particular theory, it is believed that the phthalocyanine pigment and the minor component of substituted soluble metal-phthalocyanine dye do not chemically bond together, but rather the two compounds are associated through weak and non-covalent bonding interactions that take place during crystal formation and growth of the primary pigment particle. It is also thought that the final nanoscale pigment particles, which may further comprise aggregated primary pigment nanoparticles, consist of stacked layers of the phthalocyanine chromophore wherein the soluble dye molecules of substituted soluble metal-phthalocyanine can be intercalated between those face-stacked layers of the chromogen and/or associated at the termini of the pigment particle aggregates. The pigment crystal growth or pigment particle aggregation is believed to occur by a self-assembly mechanism, in which the sterically bulky, soluble metal-phthalocyanine dye molecules behave like crystal growth regulators of the phthalocyanine chromogen, which can either intercalate or interrupt the self-assembly of stacked layers of phthalocyanine pigment molecules. Aggregation and hence growth of the phthalocyanine pigment particles is thus limited by the presence of the non-covalently associated sterically bulky and soluble metal-phthalocyanine dye molecules, resulting in a phthalocyanine pigment crystal or primary particle of desired, finite nanometer-size.

The term "intercalated" refers, for example, to molecules of the soluble substituted metal-phthalocyanine dye being interpenetrated between stacked layers of the phthalocyanine chromogen or molecule. In addition to intercalation, the soluble dye molecules may also be associated with the copper phthalocyanine pigment nanoparticles at either the termini of crystal aggregates, at edges of crystal aggregates, as surface capping molecules, or as various combinations of all these modes of association, depending on the structure of the substituted metal-phthalocyanine dye.

The types of non-covalent chemical bonding that can occur between the precursor/pigment and the stabilizer are, for example, van der Waals' forces, ionic or coordination bonding, hydrogen bonding, and/or aromatic pi-stacking bonding. In embodiments, the non-covalent bonding is predominately hydrogen bonding and van der Waals' forces, but can include aromatic pi-stacking bonding as additional or alternative types of non-covalent bonding between the stabilizer compounds and the precursor/pigment.

Accordingly, in one embodiment, the nanoscale pigment particles comprise an unsubstituted phthalocyanine structure as a main component and a soluble, hydrophobically- or hydrophilically-derivatized metal-phthalocyanine dye as the minor component, the general structures of which are:

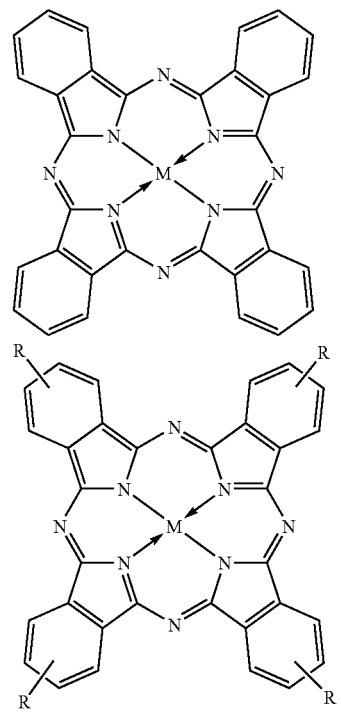

where each R represents H or the hydrophobic or hydrophilic substituent, provided that at least one R is not H. Thus, for example where M is Cu, the compounds are generally:

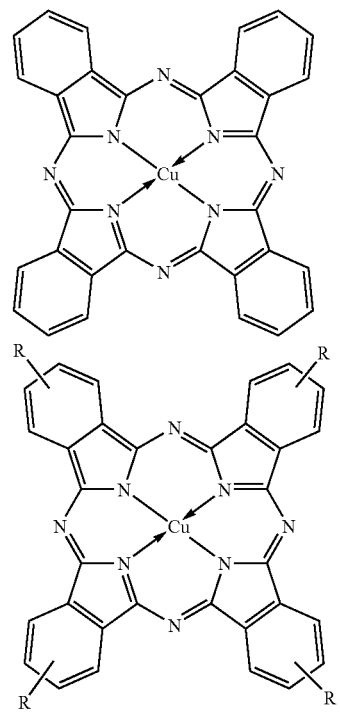

The unsubstituted phthalocyanine pigment component can be any suitable phthalocyanine pigment, such as either metal-free phthalocyanine and metal-containing phthalocyanines. In the case of the metal-containing phthalocyanines, the chromogen is formed around a coordinated central metal atom M, wherein M is an atom or group of atoms capable of bonding to the central cavity of a phthalocyanine molecule, wherein axial ligands optionally can be attached to M. About seventy atoms or groups are known to bond in the central cavity of a phthalocyanine molecule, as disclosed in, for example, *Phthalocyanine Materials*, N. B. McKeown, Cambridge University Press (1998), Chapter 1, Table 1.1, the disclosure of which is totally incorporated herein by reference, including, but not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, and the like; a divalent halometal or -metalloid group, such as chloroiron(III), chlorotitanium(III), chlorochromium(III), chloroaluminum, chlorogallium, chloroindium, chlorophosphorus (III), dichlorotitanium(IV), dichlorosilicon, dichlorogermanium, dichlorotin, and the like, as well as the corresponding fluorides, bromides, and iodides; a divalent hydroxy metal group, such as hydroxyaluminum, hydroxygallium, dihydroxysilicon, dihydroxygermanium, dihydroxytin, and the like; a divalent oxo-metal group, such as oxo-molybdenum(IV), oxo-vanadium(IV), oxo-titanium(IV), and the like; a divalent metal- or metalloidal-oxyhydrocarbon group, such as alkoxyaluminum, alkoxygallium, dialkoxysilicon, diaryloxygermanium, and the like, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; and the like, as well as mixtures thereof.

The substituted soluble metal-phthalocyanine dye can be any suitable phthalocyanine compound that is peripherally-substituted with one, two, three, four, or more sterically bulky aliphatic and/or aromatic functional groups. In general, there are four available sites on each of the peripheral phenyl rings, thus there can be as many as sixteen peripherally substituted (p-s) groups. The number of groups on the starting material (phthalonitrile) determines the number of p-s groups on the phthalocyanine. Generally, in embodiments, if only one type of phthalonitrile is used, and if it has one group, the resulting phthalocyanine will have 4 p-s groups (2 affords 8, 3 affords 12 etc). However, in embodiments where a mixture of phthalonitriles is used, you can get any number (up to 16) p-s groups. Exemplary compounds include those of the formula:

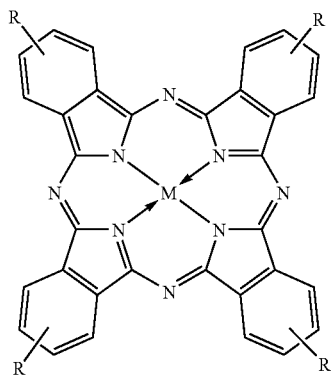

where R and M are defined as above. Suitable hydrophobically-substituted metal-phthalocyanine dyes include, for example, substituted metal phthalocyanines formed around a centrally coordinated metal atom M, wherein M is an atom or group of atoms capable of bonding to the central cavity of a phthalocyanine molecule, wherein axial ligands optionally can be attached to M. The metal-phthalocyanine is suitably peripherally-substituted with 1, 2, 3, or 4, or more, sterically bulky hydrophobic groups represented as functional group R above, although peripherally tetra-substituted metal-phthalocyanines are desirable for their efficacy in limiting pigment crystal growth to nanoparticle size. Peripherally tetra-substituted phthalocyanines that are soluble in organic media have substituents at the 2- (or 3-) positions, or at the 1-(or 4-) positions, as illustrated above, and typically have bulky (e.g. secondary- or tertiary-alkyl groups) or long alkyl chains (e.g., more than about 5 carbons) at those positions. Another class of phthalocyanines that are soluble in common organic solvents is the peripherally octa-substituted compounds illustrated below. The substituents can occupy either the 1,4- or the 2,3-positions. When both groups $R_x$ and $R_y$ are the same, these compounds are generally obtained as a single isomer. The solubility in a given solvent is related to the nature and chain length of the R group ($R_x$ and/or $R_y$), with more than about five carbon atoms per chain being typical:

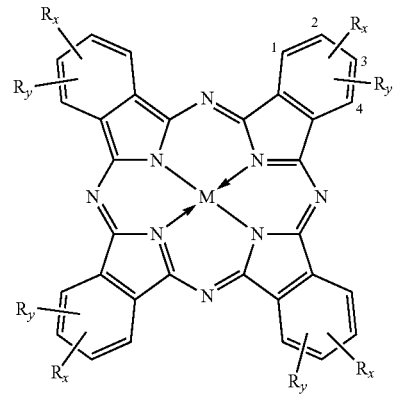

Many examples have been reported for this class, for example: 2,3-alkyl (K. Ohta, L. Jacquemin, C. Sirlin, L. Bosio, and J. Simon, *New J. Chem.*, 12 (1988), 751), 1,4-alkyl (N. B. McKeown, I. Chambrier, and M. J. Cook, *J. Chem. Soc. Perkin Trans.*, 1 (1990), 1169), 2,3-alkoxy (E. Orthmann and G. Wegner, *Angew. Chem. Int. Ed. Engl.*, 25 (1986), 1105), 1,4-alkoxy (A. N. Cammidge, M. J. Cook, K. J. Harrison, and N. B. McKeown, *J. Chem. Soc. Perkin Trans.*, 1 (1991), 3053), 2,3-alkoxymethylene (G. Pawlowski and M. Hanack, *Synthesis*, (1980), 287; and C. Piechoki and J. Simon, *Chem. Comm.* (1985), 259), 1,4-alkoxymethylene (M. J. Cook, A. J. Dunn, S. D. Howe, A. J. Thomson, and K. J. Harrison, *J. Chem. Soc. Perkin Trans.*, 1 (1988), 2453), and 2,3-alkyldicarboximide (N. Kobayashi, Y. Nishiyama, T. Oya, and M. Sato, *J. Chem. Soc. Chem. Comm.*, (1987), 390). The entire disclosure of each of these references is incorporated herein by reference.

Exemplary suitable functional groups R (including groups $R_x$ and $R_y$) in the above formulas that can be attached to the periphery of the metal-phthalocyanine include organic aliphatic or aromatic groups, such as substituted or unsubstituted alkyl, aryl, alkylaryl, or arylalkyl groups, such as having from 1 to about 50 carbon atoms, or from about 4 to about 40 carbon atoms, or from about 10 to about 30 carbon atoms. The alkyl hydrocarbon groups can be either linear, branched or cyclic in structure, and can be fully saturated or may contain unsaturation such as having ethylenically unsaturated moieties or double bonds including C═O, C═N, C═S and the like. In addition, other suitable functional groups R that can be attached to the periphery of the metal-phthalocyanine include alkylenoxy groups, poly(alkylether) groups, aryloxy groups, alkyloxyaryl groups, aryloxyalkyl groups, alkylamino groups, alkylaminoaryl groups, and alkanecarbonyl groups R(C=O)—. The alkyl functional groups that are peripherally-substituted may also contain heteroatoms such as O, N, S, P, as well as halogen atom substituents such as Cl, Br, F, I. The aryl functional groups that are peripherally-substituted can be hydrocarbon-based or can also be heterocyclic aromatic groups, such as pyridyl, furanyl, pyrimidinyl, pyrazolyl, oxazolyl, pyrrolidinyl, pyranyl, and the like. Some reported examples of R-groups conferring solubility include tert-butyl, neo-pentyloxy, 4-cumylphenoxy, oligo-(ethyleneoxy), long-chain alkylsulfamoyl $RNHSO_2$, long-chain alkyl carboxylate ROCO—, and long-chain alkyl carboxamide, RNHCO—, the disclosures of which are referenced in U.S. Pat. No. 6,472,523, and the entire disclosure of which is incorporated herein by reference above.

The hydrocarbon groups R can be unsubstituted or substituted with one or more groups selected from the group consisting of methyl, ethyl, propyl, iso-propyl, n-butyl, iso-butyl, sec-butyl, tert-butyl, n-pentyl, iso-pentyl, neo-pentyl, cyclopentyl, n-hexyl, cyclohexyl, n-heptyl, n-octyl, iso-octyl, cyclooctyl, bicyclo[2.2.2]heptanyl, bicyclo[2.2.2]octanyl, n-nonyl, decyl, undecyl, dodecyl, tridecyl, tetradecyl, pentadecyl, hexadecyl (or cetyl), octadecyl (or stearyl), iso-octadecyl (or iso-stearyl), eicosanyl, docosanyl, tetracosanyl, hexacosanyl, octacosanyl, triacontanyl, hexatriacontanyl and the like, vinyl, styrl, trimethylsiloxyl, trichlorosilylethyl, trichlorosilylpropyl, dichlorosilylethyl, chlorosilylethyl, phenyl, benzyl, naphthyl, anthranyl, phenanthryl, fluorenyl, norbornenyl, silanyl, siloxanyl, dimethylsilanyl, dimethylsiloxanyl, alkyloxy groups, phenoxy groups, benzyloxy groups, (meth)acryl, among others. In other embodiments, suitable examples of the functional groups attached to the metal-phthalocyanine include wax-like aliphatic groups. The term "wax-like aliphatic group" refers, for example, to a long, hydrophobic chain having at least 10 or at least 12 or at least 16 carbon atoms, such as having from about 10 to about 100 or from about 12 to about 50 or from about 16 to about 40 carbon atoms. The wax-like aliphatic group can be a saturated alkane hydrocarbon, such as poly(alkylene) wax like polyethylene, polypropylene, and the like, or can be unsaturated hydrocarbon like polybutadiene, polyisoprene, and the like, or can be a short saturated alkane group, either linear, branched or containing cyclic groups, such as hexadecyl, octadecyl, eicosanyl, docosanyl, tetracosanyl, hexacosanyl, octacosanyl, triacontanyl, hexatriacontanyl, or larger and including mixtures thereof. The wax-like aliphatic group can also have multiple reactive functional groups for attachment to the metal-phthalocyanine. Examples of compounds having multiple reactive functional groups are the C-36 dimer diol, C-36 dimer diacid, or C-36 dimer diamine, which are commercial wax-like aliphatic compounds available from UNIQEMA® that contain either two alcohol, carboxylic acid, amino or isocyanate functional groups, respectively, and are manufactured by dimerization of oleic acid and derivatives. The wax-like aliphatic hydrocarbon can possess from 1 to about 10 reactive functional groups, such as 1 to about 6 reactive functional groups, or from 1 to about 4 reactive functional groups.

In embodiments, it is desired that the functional groups attached to the periphery of the metal-phthalocyanine be the same. That is, where the metal-phthalocyanine is di-, tri- or tetra-substituted, it is desired in embodiments that the 2, 3, or 4 substituted groups all be the same. However, in cases of obtaining peripherally tetra-substituted soluble phthalocyanine dyes, all four R groups need not be identical. Tetra-substituted phthalocyanines having different R groups have been described in "Synthesis of Novel Unsymmetrical Substituted Push-Pull Phthalocyanines," A. Sastre, B. del Rey, and T. Torres, *J. Org. Chem.*, 61 (24), 8591 (1996), the disclosure of which is totally incorporated herein by reference, and can be obtained, for example, by using a mixture of different substituted phthalocyanine chromogen materials. This paper discloses the synthesis and characterization of non-centrosymmetrically, push-pull substituted metal-free phthalocyanines. It is possible in embodiments to use different functional groups in the tetra-substituted soluble metal phthalocyanine dye to achieve the desired efficacy as a steric barrier agent and thus control or limit the extent of pigment crystal growth and particle size. When two, differently-substituted precursors are chemically converted to form phthalocyanine, a mixture of six different isomers are possible. However by using specially designed intermediates, it is possible to control the number of possible isomers. For example, "Synthesis and Characterization of Di-disubstituted Phthalocyanines," J. G. Young and W. Onyebuagu, *J. Org. Chem.*, Vol. 55, No. 7, p. 2155 (1990), the disclosure of which is totally incorporated herein by reference, discloses an improved approach to the synthesis of di-disubstituted phthalocyanines from two different phthalyl precursors wherein the resultant product contains two different R-groups. This method can be applied to the synthesis of both metal-free and metal-coordinated phthalocyanines.

Specific examples of suitable hydrophobically-substituted metal-phthalocyanine dyes include peripherally substituted metal phthalocyanines, such as tetra(4-pentadecylphenoxy) copper phthalocyanine dye, the structure of which is shown for reference below. Peripherally tetra-substituted phthalocyanines having the same substituent at either position 2 or 3 are comprised of a mixture of four constitutional isomers, which are named according to their symmetry space group as $C_{4h}$, $D_{2h}$, $C_{2v}$ and $C_s$ in a ratio of 1:1:2:4, respectively, which are illustrated below and result from the statistical cyclotetramerization of four isoindolenine units (which are the mechanistic intermediates).

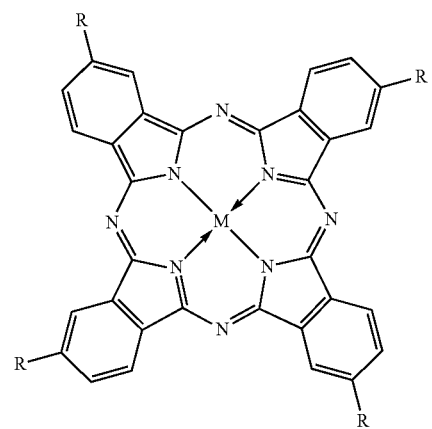

$C_{4h}$

One particular class of suitable hydrophobic metal-phthalocyanine dyes include those of the structure:

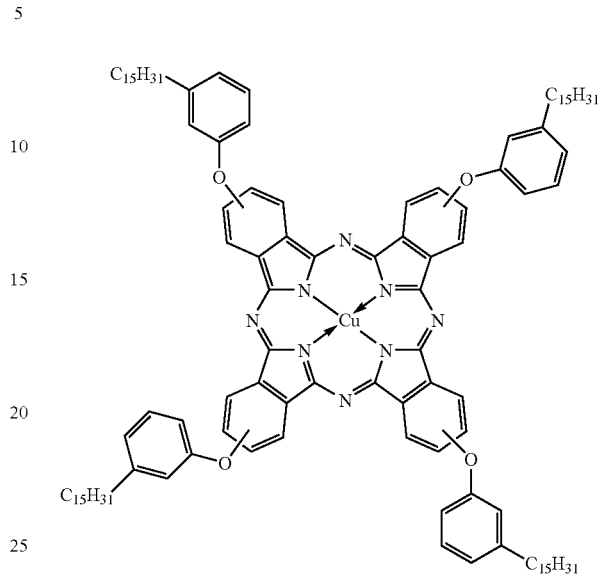

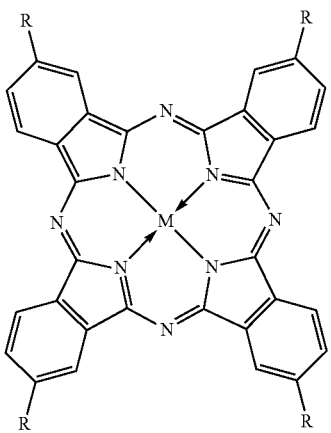

D$_{2h}$

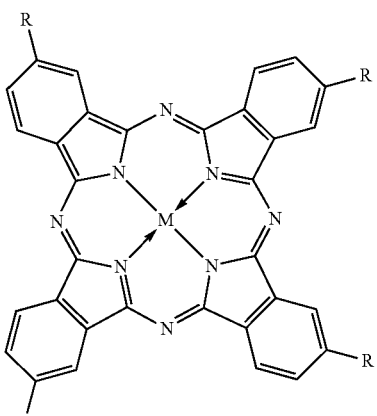

C$_{2v}$

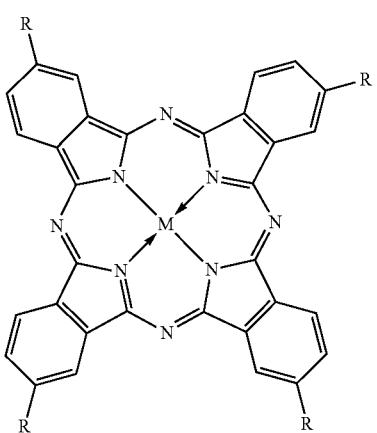

C$_s$ wherein M is an atom or group of atoms capable of bonding to the central cavity of a phthalocyanine molecule, wherein axial ligands optionally can be attached to M. About seventy atoms or groups are known to bond in the central cavity of a phthalocyanine molecule, as disclosed in, for example, *Phthalocyanine Materials*, N. B. McKeown, Cambridge University Press (1998), Chapter 1, Table 1.1, the disclosure of which is totally incorporated herein by reference. Examples of suitable atoms or group of atoms M include, but are not limited to, two hydrogen, lithium, sodium, or potassium atoms; a divalent metal atom, such as beryllium, magnesium, calcium, strontium, barium, chromium, manganese, iron, cobalt, nickel, copper, zinc, tin, lead, cadmium, and the like; a divalent halometal or -metalloid group, such as chloroiron (III), chlorotitanium(III), chlorochromium(III), chloroaluminum, chlorogallium, chloroindium, chlorophosphorus(III), dichlorotitanium(IV), dichlorosilicon, dichlorogermanium, dichlorotin, and the like as well as the corresponding fluorides, bromides, and iodides; a divalent hydroxy metal group, such as hydroxyaluminum, hydroxygallium, dihydroxysilicon, dihydroxygermanium, dihydroxytin, and the like; a divalent oxo-metal group, such as oxo-molybdenum(IV), oxo-vanadium(IV), oxo-titanium(IV), and the like; a divalent metal- or metalloidal-oxyhydrocarbon group, such as alkoxyaluminum, alkoxygallium, dialkoxysilicon, diaryloxygermanium, and the like, wherein the oxyhydrocarbon group is an oxyalkyl group, an oxyaryl group, an oxyalkylaryl group, an oxyarylalkyl group, an oxyheterocyclic group, or mixtures thereof, and typically (although not necessarily) contains from one to about twenty carbon atoms; and the like, as well as mixtures thereof.

Although not limited to any theory, it is believed that in most instances the colorant molecules of these hydrophobic metal-phthalocyanine dyes are obtained as mixtures of four isomeric forms as illustrated below, wherein the C$_{4h}$, D$_{2h}$, C$_{2v}$, and C$_s$ isomers are present in the approximate ratio of, respectively, about 1:1:2:4:

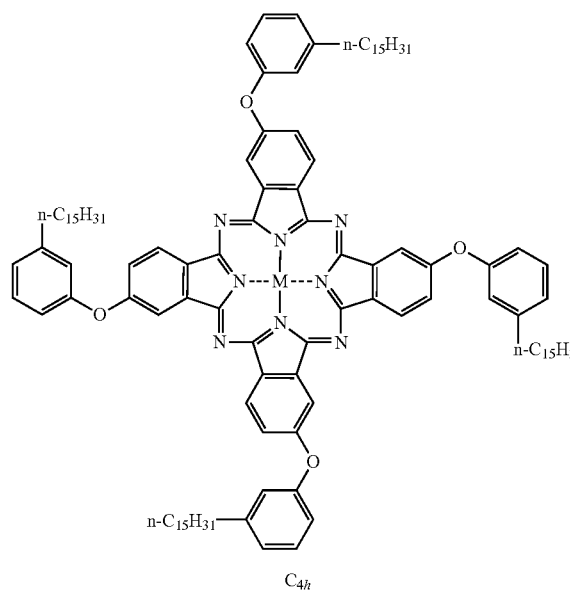

C_{4h}

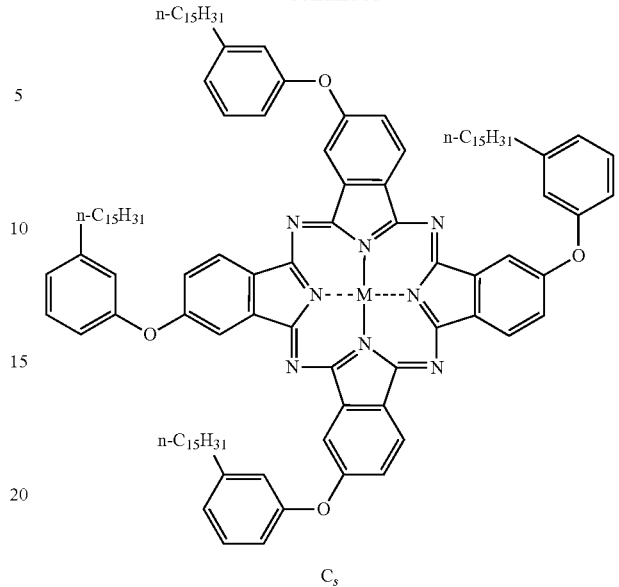

C_s

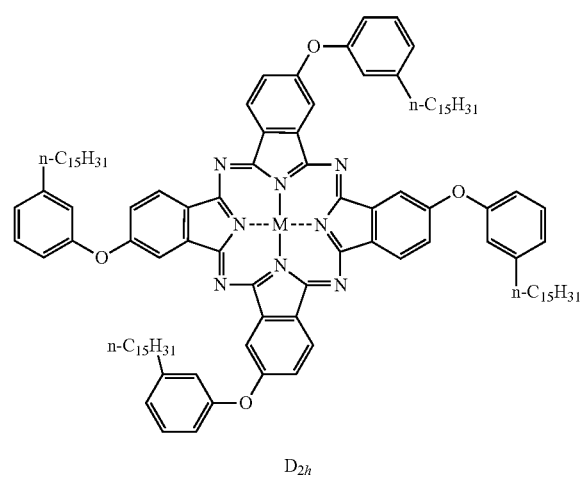

D_{2h}

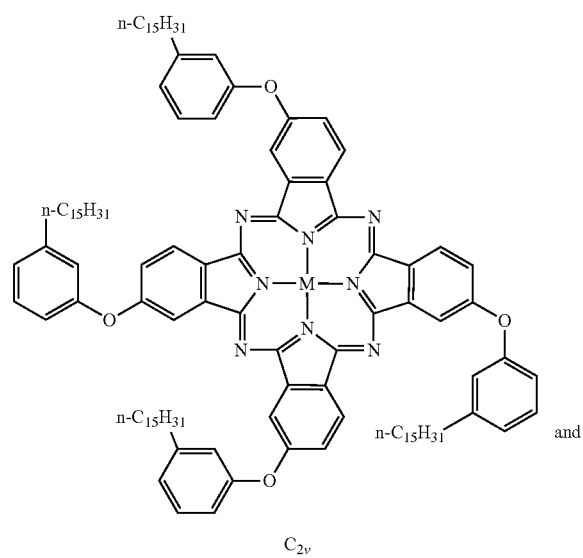

C_{2v} and

These nanoscale pigment particle compositions can be prepared by any desired or effective process. However, in embodiments is provided a one-step process whereby the unsubstituted phthalocyanine molecules and the hydrophobically- or hydrophilically-derivatized metal-phthalocyanine dye molecules are assembled concurrently, and thus at the same time these molecules non-covalently associate with each other as they are formed to provide the nanoscale pigment particles.

As reactant starting materials, the process uses any suitable phthalocyanine chromogen material and substituted (such as hydrophobically or hydrophilically substituted) phthalocyanine chromogen material. Suitable phthalocyanine chromogen materials include phthalic anhydride or its derivatives. Examples of the phthalic anhydride or its derivative to be used in the process include phthalic acid and salts or esters thereof, phthalic anhydride, phthalimide, phthalamic acid, ortho-cyanobenzamide, 1,3-diiminoisoindoline and salts or esters thereof, phthalonitrile, and compounds having the same structures as the above-enumerated compounds provided that they have a substituent such as a chlorine atom, a bromine atom, an alkyl group, a phenyl group, or a sulfonic group on the benzene nucleus. For example, suitable phthalocyanine chromogen materials include phthalonitrile units of the formula:

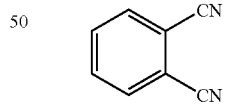

Likewise, suitable substituted phthalocyanine chromogen materials include substituted phthalonitrile units of the formula:

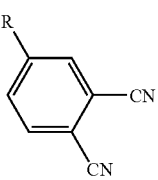

where R is as defined above but is other than hydrogen. Thus, R can be, for example, any suitable hydrophobic or hydrophilic substituent. Exemplary suitable functional groups R (include organic aliphatic or aromatic groups, such as substituted or unsubstituted alkyl, aryl, alkylaryl, or arylalkyl groups, such as having from 1 to about 50 carbon atoms, or from about 4 to about 40 carbon atoms, or from about 10 to about 30 carbon atoms. The alkyl hydrocarbon groups can be either linear, branched or cyclic in structure, and can be fully saturated or may contain unsaturation such as having ethylenically unsaturated moieties or double bonds including C=O, C=N, C=S and the like. In addition, other suitable functional groups R include alkylenoxy groups, poly(alkylether) groups, aryloxy groups, alkyloxyaryl groups, aryloxyalkyl groups, alkylamino groups, alkylaminoaryl groups, and alkanecarbonyl groups R(C=O)—. The alkyl functional groups may also contain heteroatoms such as O, N, S, P, as well as halogen atom substituents such as Cl, Br, F, I. The aryl functional groups can be hydrocarbon-based or can also be heterocyclic aromatic groups, such as pyridyl, furanyl, pyrimidinyl, pyrazolyl, oxazolyl, pyrrolidinyl, pyranyl, and the like. The groups R can be unsubstituted or substituted with one or more groups selected from the group consisting of methyl, ethyl, propyl, iso-propyl, n-butyl, iso-butyl, sec-butyl, tert-butyl, n-pentyl, iso-pentyl, neo-pentyl, cyclopentyl, n-hexyl, cyclohexyl, n-heptyl, n-octyl, iso-octyl, cyclooctyl, bicyclo[2.2.2]heptanyl, bicyclo[2.2.2]octanyl, n-nonyl, decyl, undecyl, dodecyl, tridecyl, tetradecyl, pentadecyl, hexadecyl (or cetyl), octadecyl (or stearyl), iso-octadecyl (or iso-stearyl), eicosanyl, docosanyl, tetracosanyl, hexacosanyl, octacosanyl, triacontanyl, hexatriacontanyl and the like, vinyl, styrl, trimethylsiloxyl, trichlorosilylethyl, trichlorosilylpropyl, dichlorosilylethyl, chlorosilylethyl, phenyl, benzyl, naphthyl, anthranyl, phenanthryl, fluorenyl, norbornenyl, silanyl, siloxanyl, dimethylsilanyl, dimethylsiloxanyl, alkyloxy groups, phenoxy groups, benzyloxy groups, (meth) acryl, among others. In other embodiments, suitable examples of the functional groups R include wax-like aliphatic groups, as described above.

This process can be carried out by reacting a mixture of the desired phthalocyanine chromogen material and the desired substituted phthalocyanine chromogen material in any desired ratio, with a metal salt and a catalyst in a suitable solvent.

The above phthalocyanine chromogen material and substituted phthalocyanine chromogen material can be used in any desired ratio. However, it is generally understood that as the relative amount of substituted phthalocyanine chromogen material increases, the lesser amount of unsubstituted phthalocyanine molecules will be formed, the greater number of substituted phthalocyanine molecules will be formed, and the smaller and more readily dispersed the nanopigment particles will be, until such time as the mixture becomes so dominant in the substituted form that the pigment becomes soluble in the vehicle. In embodiments, the molar (or equivalents) ratio of phthalocyanine chromogen material to substituted phthalocyanine chromogen material can range from about 50:1 to about 1:1, such as about 40:1 or about 20:1 to about 2:1 or to about 3:1. Of course, values outside these ranges can be used, if desired. In one embodiment, a molar (or equivalents) ratio of phthalocyanine chromogen material to substituted phthalocyanine chromogen material can range from about 15:1 or about 12:1 to about 5:1 or to about 7:1, such as about 10:1.

Examples of suitable metal compounds include anhydrous and hydrated salts or complexes of the formula $$MX_n \cdot yH_2O$$

wherein M is a metal, such as lithium, sodium, potassium, beryllium, magnesium, calcium, scandium, titanium, zirconium, vanadium, niobium, chromium, molybdenum, manganese, rhenium, iron, ruthenium, cobalt, rhodium, nickel, palladium, platinum, copper, zinc, cadmium, aluminum, gallium, indium, silicon, germanium, tin, lead, and the like, X is an anion, such as a carboxylate-containing moiety, such as formate, acetate, acetoacetate, propionate, butyrate, benzoate, and the like, an alkoxide, such as methoxide, ethoxide, isopropoxide, or the like, acetyl acetonate, a halide atom, such as fluoride, chloride, bromide, or iodide, sulfate, alkyl sulfonate, aryl sulfonate, nitrate, nitrite, phosphate, and the like, n is a number representing the valence of the metal, and y is an integer of from 0 to 10. Specific examples include (but are not limited to) anhydrous copper chloride, hydrated copper chloride, anhydrous copper acetate, hydrated copper acetate, anhydrous copper sulfate, hydrated copper sulfate, anhydrous copper nitrate, hydrated copper nitrate, anhydrous copper bromide, hydrated copper bromide, and the like, as well as mixtures thereof. In embodiments, the molar (or equivalents) ratio of metal salt to total chromogen material can be about 1:4, where four chromogen units condense around the metal to form the final phthalocyanine product. Of course, the ratio can vary to account for reaction efficiency, and the like.

The reaction is also generally conducted in the presence of a catalyst or reaction promoter. Examples of suitable catalysts or reaction promoters include trialkanolamines, dialkyl monoalkanolamines, monoalkyl dialkanolamines, and the like, wherein the alkyl groups, which can be connected to the nitrogen atom through a primary, secondary, or tertiary carbon atom, in one embodiment have from 1 to about 6 carbon atoms, and in another embodiment have from 1 to about 3 carbon atoms, although the number of carbon atoms can be outside of these ranges, including (but not limited to) methyl, ethyl, n-propyl, isopropyl, and the like, and wherein the alkanol groups, which can be primary, secondary, or tertiary alkanols and can be connected to the nitrogen atom through a primary, secondary, or tertiary carbon atom, in one embodiment have from about 2 to about 6 carbon atoms, and in another embodiment have from about 2 to about 3 carbon atoms, although the number of carbon atoms can be outside of these ranges, including (but not limited to) 2-hydroxyethyl, 2-hydroxypropyl, 3-hydroxypropyl, and the like, with specific examples of suitable catalysts or reaction promoters including (but not limited to) 2-diethylaminoethanol, 2-dimethylaminoethanol, 2-dimethylamino-1-propanol, and the like, as well as mixtures thereof. Other suitable catalysts or reaction promoters also include ammonia-releasing compounds, such as ammonium carbonate, ammonium carbamate, ammonium bicarbonate, ammonium molybdate, urea, ammonium salts of mono- and dicarboxylic acids, including (but not limited to) formic acid, acetic acid, propionic acid, butyric acid, benzoic acid, oxalic acid, malonic acid, and the like, as well as mixtures thereof. The catalyst or reaction promoter can be included in any suitable and desirable amount.

The reactants are dissolved in any solvent capable of dissolving the reactants, such as methanol, ethanol, propanol, butanol, dioxane, acetone, ethylene glycol, amyl alcohol, hexanol, heptanol, tetralin, decalin, ISOPAR® (refined mineral spirits solvents available from Exxon), toluene, nitrobenzene, xylene, tributyl amine, N,N-dimethylaniline, quinoline, 1-chloronaphthalene, chlorobenzene, trialkanolamines, monoalkyl dialkanolamines, dialkyl monoalkanolamines (such as 2-dimethylaminoethanol, 2-diethylaminoethanol, 2-dimethylamino-1-propanol, and the like), dimethyl formamide, dimethyl sulfoxide, N,N-dimethylformamide, N,N-dimethylacetamide, 1-methyl-2-pyrrolidinone, N-methyl pyrrolidone, 1-cyclohexyl-2-pyrrolidinone, N-cyclohexyl-2-pyrrolidinone, sulfolane, and the like, as well as mixtures thereof. The solids content of the reaction mixture in one embodiment can be from about 3 or about 10 parts by weight chromogen material per 100 part by weight solvent, to about 30 or to about 60 parts by weight chromogen material per every 100 part by weight solvent, although the solids content can be outside of these ranges.

Typically, the reaction mixture is heated, such as to reflux, to a temperature ranging from about 50° C. or about 80° C. to about 250° C., although the temperature can be outside of these ranges, for a period of time ranging from about 0.25 hour to about 24 hours, although the time can be outside of these ranges. The specific time and temperature used will depend on the choice of solvent, but in one embodiment in which n-methyl pyrrolidone is used as solvent, the reaction mixture can be heated to a temperature of about 160° C. for a period of about 16 hours. Thereafter, the reaction mixture is cooled to a temperature ranging from about 20° C. to about 60° C., although the temperature can be outside of these ranges. The reaction mixture can be filtered typically through a filter made of either paper, glass fiber, polypropylene, GORETEX®, and the like, and washed with a solvent, such as water, acetone, methyl ethyl ketone, methyl isobutyl ketone, methanol, ethanol, propanol, butanol, acetone, dimethyl formamide, dimethyl sulfoxide, N-methyl pyrrolidinone, sulfolane, and the like, as well as mixtures thereof. If desired, the precipitated blue solids can then again be filtered, reslurried with a solvent, such as acetone, methyl ethyl ketone, methyl isobutyl ketone, methanol, ethanol, propanol, butanol, acetone, dimethyl formamide, dimethyl sulfoxide, N-methyl pyrrolidinone, sulfolane, and the like, as well as mixtures thereof, for a period of time ranging from at least about 0.5 hour to about 24 hours, although the time can be outside of these ranges, and at a temperature of about 25° C. to about 100° C., although the temperature can be outside of these ranges. The product can then be filtered again and dried using standard methods for drying solids.

In cases where it is desired, a metal-free phthalocyanine can be prepared by treatment of an alkali metal phthalocyanine such as dilithium, disodium, dipotassium, beryllium, magnesium, or calcium phthalocyanine, prepared according to the above process, with a dilute aqueous or alcoholic acid. Examples of suitable acids include (but are not limited to) hydrochloric acid, phosphoric acid, sulfuric acid, nitric acid, sulfonic acids, such as alkylsulfonic, arylsulfonic, arylalkylsulfonic, and alkylarylsulfonic, wherein the alkyl portions thereof can be linear or branched, in one embodiment with from 1 to about 18 carbon atoms, and wherein the aryl portions thereof in one embodiment have from 6 to about 12 carbon atoms, although the number of carbon atoms in either the alkyl or aryl portions can be outside of this range. The acid is present in the water or alcohol solution in any desired or effective concentration, ranging from at least about 1 percent by weight acid, to not more than about 10 percent by weight acid, although the acid concentration can be outside of these ranges. Examples of suitable alcohols include (but are not limited to) methanol, ethanol, propanol, isopropanol, ethylene glycol, and the like, as well as mixtures thereof.

Other details of the production of hydrophobically substituted, soluble metal-phthalocyanine dyes can be found, for example, in U.S. Pat. No. 6,476,219, the entire disclosure of which is incorporated herein by reference.

In additional embodiments, other compounds may be used in addition to the hydrophobically substituted soluble metal-phthalocyanine dyes described herein, to function as surface active agents (or surfactants) that assist with either preventing or limiting the degree of pigment particle aggregation. Representative examples of such surface active agents include, but are not limited to, rosin natural products such as abietic acid, dehydroabietic acid, pimaric acid, rosin soaps (such as the sodium salt of the rosin acids), hydrogenated derivatives of rosins and their alkyl ester derivatives made from glycerol or pentaerythritol or other such branched alcohols, non-ionic surfactants including long-chain or branched hydrocarbon alcohols, such as for example 2-ethylhexanol, lauryl alcohol, and stearyl alcohol, and alcohol ethoxylates; acrylic-based polymers such as poly(acrylic acid), poly(methyl methacrylate), styrene-based copolymers such as poly(styrene sodiosulfonate) and poly(styrene)-co-poly(alkyl (meth)acrylate), copolymers of α-olefins such as 1-hexadecene, 1-octadecene, 1-eicosene, 1-triacontene and the like, copolymers of 4-vinyl pyridine, vinyl imidazole, and vinyl pyrrolidinone, polyester copolymers, polyamide copolymers, copolymers of acetals and acetates, such as the copolymer poly(vinylbutyral)-co-(vinyl alcohol)-co-(vinyl acetate).

The nano-sized pigment particles comprise an unsubstituted phthalocyanine compound as a main insoluble component, and a minor amount of a substituted metal-phthalocyanine dye, the general structures of which are:

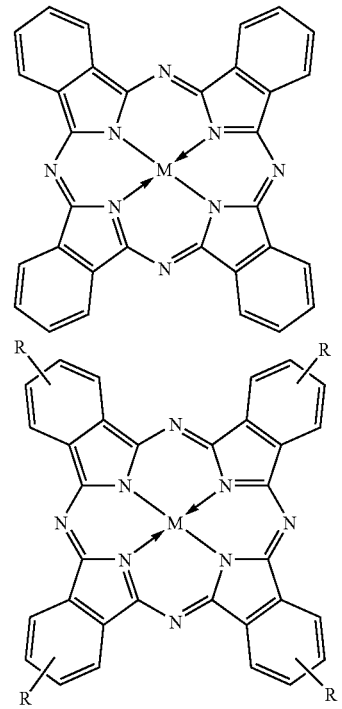

where or more, but not all, of the R groups can be hydrogen. The substituted metal-phthalocyanine dye molecules are non-covalently associated with the pigment molecules in either a random or ordered structure, or may even be intercalated within the crystal or particle structure of the unsubstituted phthalocyanine pigment component, with the crystal growth inhibitory effect of the substituted metal-phthalocyanine dye molecules being determined, by processing conditions for preparing the nanopigment composition, relative ratio of the two phthalocyanine components, selection and number of substituents of the specific substituted metal-phthalocyanine dye molecule, and the like.

The term "intercalated" refers, for example, to molecules of the soluble substituted metal-phthalocyanine dye being interpenetrated between stacked layers of the phthalocyanine chromogen or molecule. In addition to intercalation, the soluble dye molecules may also be non-covalently associated with the copper phthalocyanine pigment nanoparticles at either the termini of crystal aggregates, at edges of crystal aggregates, as surface capping molecules, or as various combinations of all these modes of association, depending on the structure of the substituted metal-phthalocyanine dye. The types of non-covalent chemical bonding that can occur between the precursor/pigment and the stabilizer are, for example, van der Waals' forces, ionic or coordination bonding, hydrogen bonding, and/or aromatic pi-stacking bonding. In embodiments, the non-covalent bonding is predominately hydrogen bonding and van der Waals' forces, but can include aromatic pi-stacking bonding as additional or alternative types of non-covalent bonding between the stabilizer compounds and the precursor/pigment.

According to embodiments, the nano-sized pigment particles can be formed using a synthesis method that takes advantage of the inherent self-assembly of phthalocyanine molecules. This is a "bottom-up" assembly method, in that assembly of the nanopigment starts on the molecular level, with the directional crystal growth of the phthalocyanine chromogen being regulated by the presence of a minor amount of substituted phthalocyanine chromogen molecules. In contrast to using typical manufacturing methods for producing nanoscale-sized pigments by subjecting crude, bulk synthesized pigments to extensive high-energy mechanical grinding processes, the resultant products are obtained in a simple, low-cost and rapid process based on self-assembly and have a desired average particle size in the nanometer scale size range, with a much narrower particle size distribution and more uniform crystal structure.

In embodiments, controlling the extent of crystal growth and therefore of phthalocyanine nanoparticle size, distribution and shape, and potentially the optical and electronic properties of such nanoscale pigments, can be achieved by utilizing only the precursor raw materials for synthesizing both the unsubstituted phthalocyanine pigment as well as the small amount of substituted soluble metal-phthalocyanine dye molecules. In this manner, the small amount of substituted metal-phthalocyanine dye is generated in situ concomitantly with the synthesis of the unsubstituted phthalocyanine chromogen. In this manner, the extent and direction of phthalocyanine crystal growth is more controlled, allowing the crystal growth inhibiting action of the substituted metal-phthalocyanine dye molecules to take full effect. This inhibitory action could be tunable by several processing factors, which include, but are not limited to, structure type and number of hydrophobic substituents on the soluble metal-phthalocyanine dye, relative ratio of the dye precursors to the phthalocyanine chromogen precursors, choice of reaction process chemistry, reactant concentrations and ratios, reaction temperature, solvents, catalysts, reaction time, and product isolation steps.

The formed nanoscale pigment particle compositions can be used, for example, as coloring agents in a variety of compositions, such as in liquid (aqueous or non-aqueous) ink vehicles, including inks used in conventional pens, markers, and the like, liquid inkjet ink compositions, solid or phase change ink compositions, and the like. For example, the colored nanoparticles can be formulated into a variety of ink vehicles, including "low energy" solid inks with melt temperatures of about 60° C. to about 130° C., solvent-based liquid inks or radiation-curable such as UV-curable liquid inks comprised of alkyloxylated monomers, and even aqueous inks. The ink compositions can be used in a variety of conventional ink jet printing process, including thermal, acoustic, drop-on-demand, piezoelectric, and the like.

In addition to ink compositions, the nano-sized phthalocyanine pigment particle compositions can be used in a variety of other applications, where it is desired to provide a specific color to the composition. For example, the compositions can also be used in the same manner as conventional pigments in such uses as colorants for paints, coatings and automotive finishes, plastic resins, lenses, optical filters, all types of printing inks, and the like according to applications thereof. By way of example only, the compositions of embodiments can be used for toner compositions, which include polymer particles and nano-sized pigment particles, along with other optional additives, that are formed into toner particles and optionally treated with internal or external additives such as flow aids, charge control agents, charge-enhancing agents, filler particles, radiation-curable agents or particles, surface release agents, and the like. The toner composition of the present invention can be prepared by a number of known methods including extrusion melt blending of the toner resin particles, nano-sized pigment particles and other colorants and other optional additives, followed by mechanical comminution and classification. Other methods include those well known in the art such as spray drying, melt dispersion, extrusion processing, dispersion polymerization, and suspension polymerization. Further, the toner compositions can be prepared by emulsion/aggregation/coalescence processes, as disclosed in U.S. Pat. Nos. 5,290,654, 5,278,020, 5,308,734, 5,370,963, 5,344,738, 5,403,693, 5,418,108, 5,364,729, and 5,346,797, the entire disclosures of which are incorporated herein by reference. The toner particles can in turn be mixed with carrier particles to form developer compositions. The toner and developer compositions can be used in a variety of electrophotographic printing systems.

In addition to ink and toner applications, the nanopigments of embodiments can be applied in other fields where phthalocyanine pigments are typically used. For example, the nanopigments can be used in applications that make use of optoelectronic compounds, such as for charge generating materials in electrophotographic imaging members, and the like.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

Preparation of Phthalocyanine-Based Cyan Nanopigment

Into a 50 mL round-bottom flask is added pentadecylphenoxy-phthalonitrile (3.36 g, 7.8 mmol, 0.4 eq.), o-phthalonitrile (9 g, 70.2 mmol, 3.6 eq.), copper acetate (3.6 g, 19.5 mmol, 1 eq.), catalyst 2-dimethylaminoethanol (DMAE) (20 mg—2 drops), and the solvent N-methyl pyrrolidone (NMP, 30 mL). The mixture is stirred and heated to 160 C overnight, cooled to 100° C., filtered and washed with hot DMF, and then acetone, and oven dried. The particles observed by Transmission Electron Microscopy (TEM) include nanoparticles along with larger-sized aggregate particles.

Example 2

Making a Solid Ink Nanopigment Concentrate

A preparation for pigmented Solid Ink which can be used with the pigment from Example 1 is as follows:

Into a Szegvari 01 attritor is charged 1800.0 g ⅛ inch diameter 440 C Grade 25 steel balls available from Hoover Precision Products, Inc. The following components are added together and melt mixed at 120° C. in a 600 mL beaker: 73.95 g of a triamide wax (triamide described in U.S. Pat. No. 6,860,930), 74.25 g S-180 (N-stearyl stearamide, commercially available from Crompton Corporation), 0.3 g Naugard-445 (an antioxidant) available from Crompton Corp., 33.00 g of SOLSPERSE® 19200 (50% solids in toluene), available from Lubrizol Corporation, are added to the above solution and stirred to complete dissolution. The resultant solution is quantitatively transferred to the attritor vessel. To the attritor vessel is added 16.50 g of pigment. A multi-armed impeller is then attached to the attritor and the speed adjusted to give an impeller tip velocity of about 4.5 cm/s. The pigmented mixture is ground overnight for about 18 hours, affording an ink concentrate having excellent free-flowing behavior that can be discharged and separated from the steel balls in the molten state.

Example 3

Dilution of Solid Ink Concentrate

The nanopigment ink concentrate from Example 2 is diluted with 57.2 g of a molten and thoroughly mixed diluent comprised of the following: 71.72 g of a distilled Polyethylene Wax from Baker Petrolite, 3.17 g of a triamide wax (triamide described in U.S. Pat. No. 6,860,930), 3.10 g S-180 (N-stearyl stearamide, commercially available from Crompton Corporation), 15.58 g KE-100 resin (commercially available from Arakawa Corporation), 0.15 g Naugard-445 (an antioxidant, available from Crompton Corporation), 1.54 g Solsperse☐ 19200, available from Lubrizol Corporation. The diluent solution is added to a heated separatory funnel (120° C.) and then added drop-wise to the vigorously stirred (400 RPM) concentrate in Example 2 (41.25 g). After addition of the diluent to the concentrate, the ink's pigment concentration is 3% by weight. The ink is stirred an additional 3.5 hours.

Example 4

Ink Filtration

The ink made in Example 3 is filtered through a 6 μm glass fiber filter from Pall Corporation and has a viscosity ranging from 10-20 cP at 100 s$^{-1}$.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A process for preparing nanoscale pigment particles of phthalocyanine pigments, comprising the steps of:
   (i) providing:
      (1) an unsubstituted phthalocyanine chromogen material comprising an unsubstituted phthalonitrile; and
      (2) a substituted phthalocyanine chromogen material comprising a substituted phthalonitrile, wherein the substituted phthalonitrile is substituted with an alkylphenoxy group;
   (ii) reacting the unsubstituted phthalocyanine chromogen material and the substituted phthalocyanine chromogen material to form a mixture of unsubstituted phthalocyanine dye molecules and substituted phthalocyanine dye molecules, and
   (iii) causing said substituted phthalocyanine dye molecules to non-covalently associate with the unsubstituted phthalocyanine dye molecules, so as to limit an extent of particle growth and aggregation and result in nanoscale pigment particles, wherein at least one of the substituted phthalocyanine dye molecules comprises a molecule of the formula:

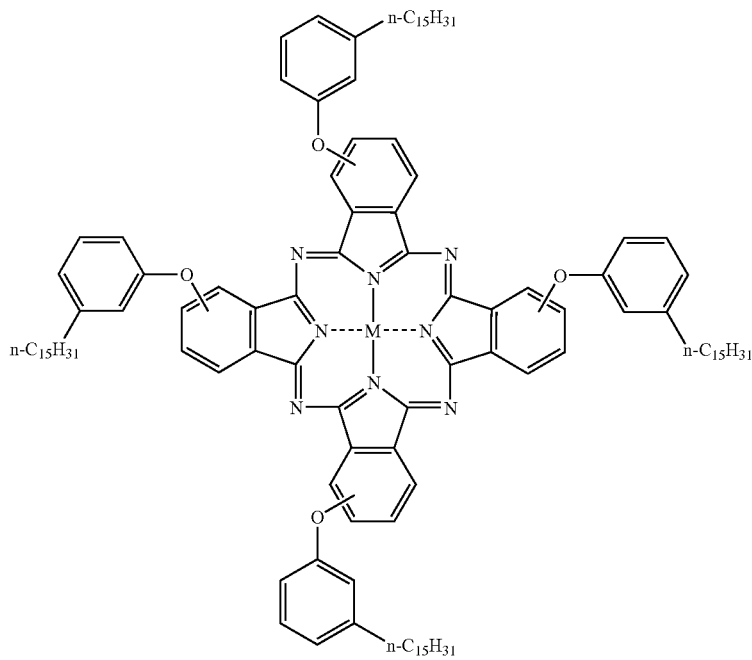

where M is an atom or group of atoms capable of bonding to the central cavity of a phthalocyanine molecule, and axial ligands can optionally be attached to M; and the unsubstituted phthalocyanine dye molecule is represented by the formula:

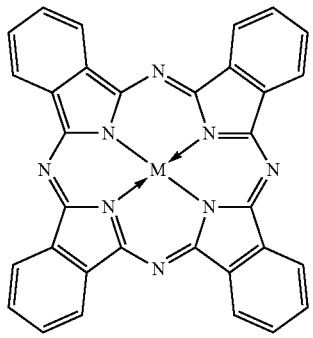

where M is a metal or group of metals or atoms capable of bonding to the central cavity of the phthalocyanine molecule.

2. The process of claim 1, wherein the nanoscale pigment particles are formed without utilizing a grinding step to reduce a particle size of formed crystal particles.

3. The process of claim 1, wherein M is selected from the group consisting of lithium, sodium, or potassium atoms, a divalent metal atom, a divalent halometal or -metalloid group, a divalent hydroxy metal group, a divalent oxo-metal group, and a divalent metal- or metalloidal-oxyhydrocarbon group, wherein the oxyhydrocarbon group is an oxyalkyl group, an oxyaryl group, an oxyalkylaryl group, an oxyarylalkyl group, an oxyheterocyclic group, or mixtures thereof, the oxyhydrocarbon group containing from one to about twenty carbon atoms.

4. The process of claim 1, wherein the reacting comprises reacting the unsubstituted phthalocyanine chromogen and the substituted phthalocyanine chromogen with a metal salt and a catalyst in a solvent.

5. The process of claim 4, wherein the unsubstituted phthalocyanine chromogen and the substituted phthalocyanine chromogen are present in relative amounts of from about 50 to about 1 molar equivalents of unsubstituted phthalocyanine chromogen to about 1 molar equivalents of substituted phthalocyanine chromogen, and the metal salt is present in an amount of about one molar equivalent metal salt to four molar equivalents of combined unsubstituted phthalocyanine chromogen and substituted phthalocyanine chromogen.

6. The process of claim 4, wherein the metal salt is an anhydrous or hydrated salt or complex of the formula $$MX_n \cdot yH_2O$$

wherein M is a metal selected from the group consisting of lithium, sodium, potassium, beryllium, magnesium, calcium, scandium, titanium, zirconium, vanadium, niobium, chromium, molybdenum, manganese, rhenium, iron, ruthenium, cobalt, rhodium, nickel, palladium, platinum, copper, zinc, cadmium, aluminum, gallium, indium, silicon, germanium, tin, and lead; X is an anion selected from the group consisting of a carboxylate-containing moiety, an alkoxide, acetyl acetonate, a halide atom, sulfate, alkyl sulfonate, aryl sulfonate, nitrate, nitrite, and phosphate; n is a number representing the valence of the metal M; and y is an integer of from 0 to about 10.

7. The process of claim 4, wherein the catalyst is selected from the group consisting of 2-diethylaminoethanol, 2-dimethylaminoethanol, 2-dimethylamino-I-propanol, ammonium carbonate, ammonium carbamate, ammonium bicarbonate, ammonium molybdate, urea, ammonium salts of mono- and dicarboxylic acids, and mixtures thereof.

8. The process of claim 4, wherein the solvent is selected from the group consisting of methanol, ethanol, propanol, butanol, dioxane, acetone, ethylene glycol, amyl alcohol, hexanol, heptanol, tetralin, decalin, isoparaffinic hydrocarbon, toluene, nitrobenzene, xylene, tributyl amine, N,N-dimethylaniline, quinoline, 1-chloronaphthalene, trialkanolamines, monoalkyl dialkanolamines, dialkyl monoalkanolamines, dimethyl formamide, dimethyl sulfoxide, N,N-dimethylformamide, N,N-dimethylacetamide, 1-methyl-2-pyrrolidinone, N-methyl pyrrolidone, 1-cyclohexyl-2-pyrrolidinone, N-cyclohexyl-2-pyrrolidinone, sulfolane, and mixtures thereof.

9. The process of claim 4, wherein the reacting further comprises heating to a temperature of about 50° C. to about 250° C. for a time of from about 0.25 hour to about 24 hours.

10. The process of claim 1, wherein the substituted phthalocyanine dye molecules are intercalated between layers of the unsubstituted phthalocyanine dye molecules or are associated non-covalently with the substituted phthalocyanine dye molecules at termini or surfaces of the pigment particle aggregates.

11. The process of claim 1, wherein the nanoscale pigment particles have an average particle size of from about 1 nm to about 150 nm.

12. The process of claim 4, wherein the solvent is selected from the group consisting of 2-dimethylaminoethanol, 2-diethylaminoethanol, 2-dimethylamino-1-propanol, and mixtures thereof.

* * * * *